Jan. 12, 1932.  H. C. SCHAPER  1,840,823
WEIGHING SCALE
Filed Aug. 12, 1929   3 Sheets-Sheet 1
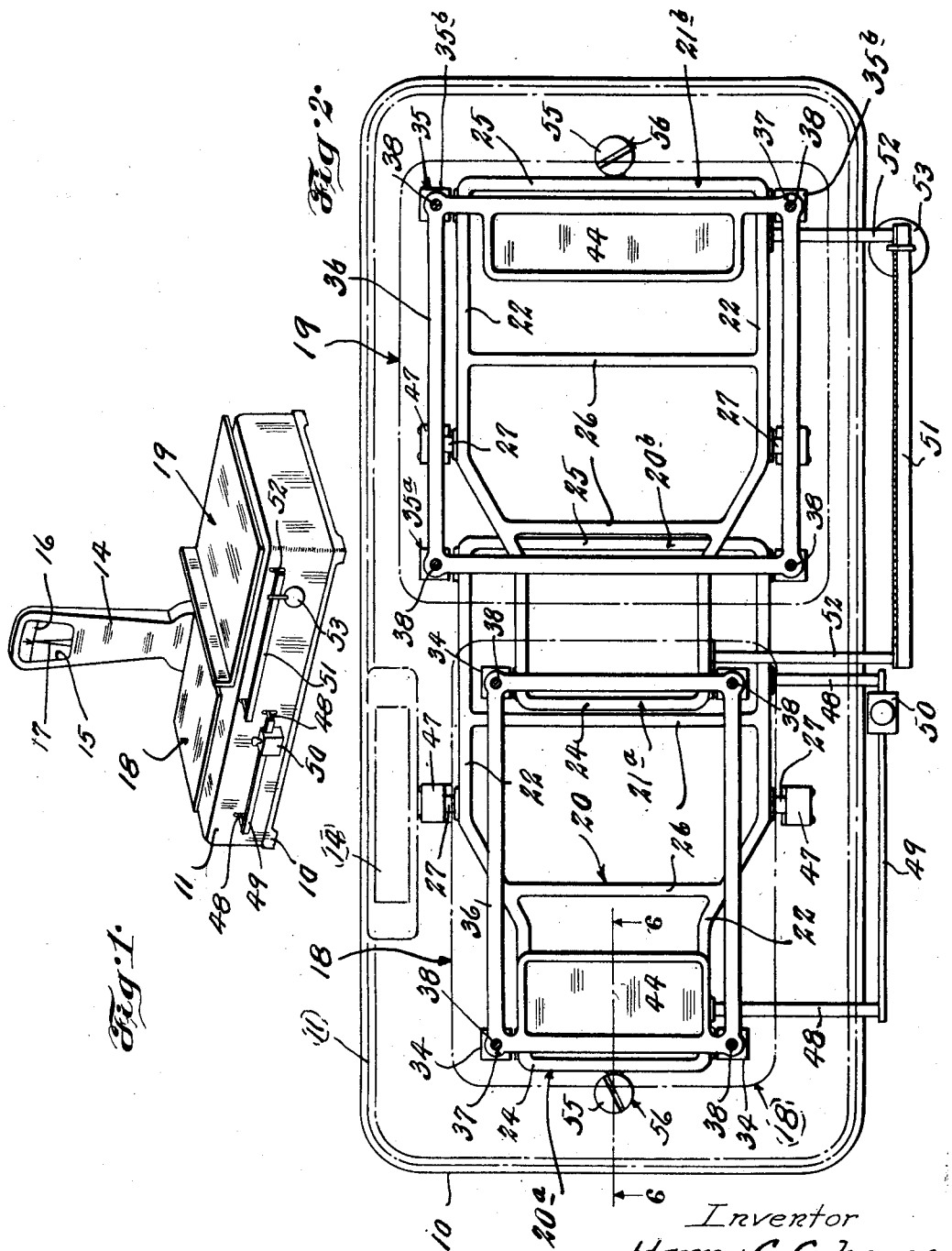
Inventor
Harry C. Schaper
By Cornwall & Janus
Attorneys

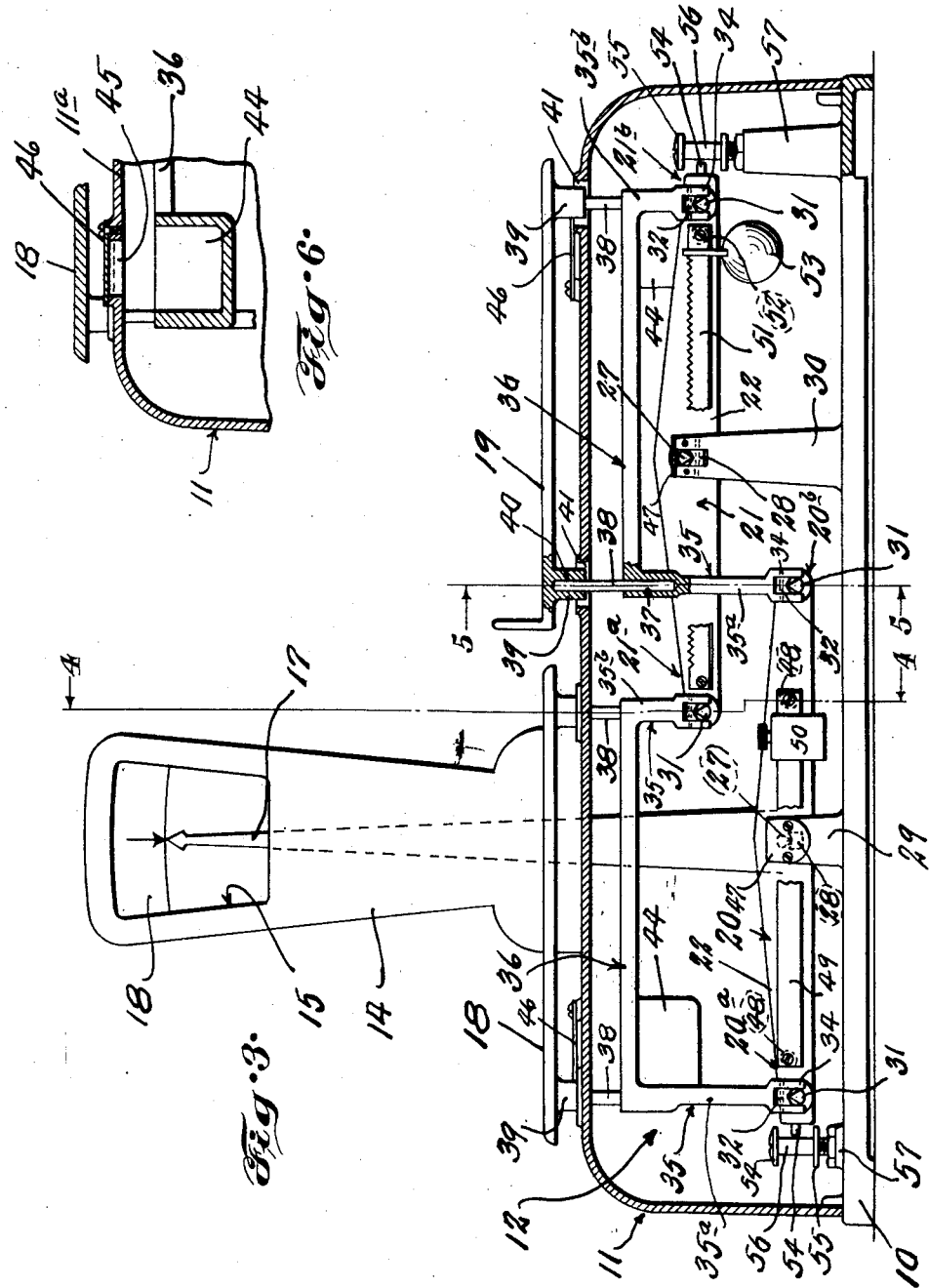

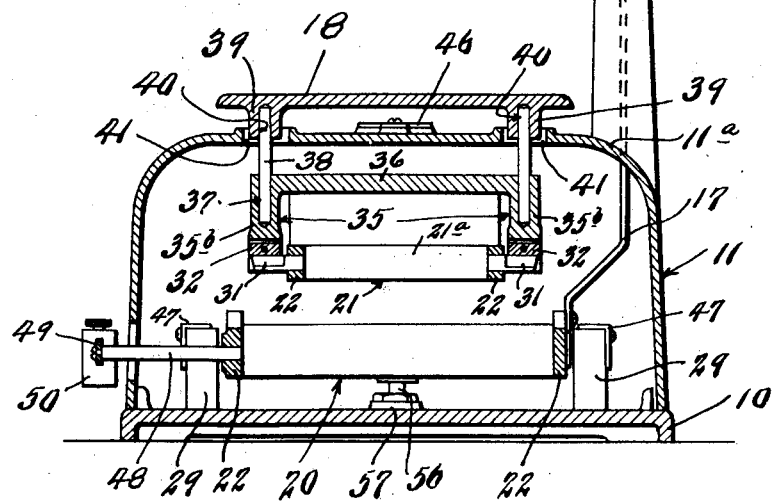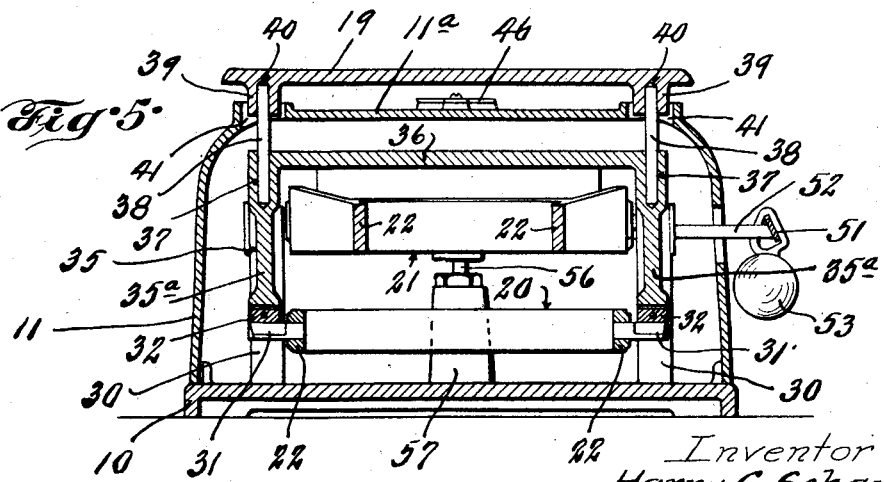

Patented Jan. 12, 1932                                                               1,840,823

UNITED STATES PATENT OFFICE

HARRY C. SCHAPER, OF COLUMBUS, OHIO, ASSIGNOR TO THE EXACT WEIGHT SCALE COMPANY, OF COLUMBUS, OHIO, A CORPORATION OF OHIO

WEIGHING SCALE

Application filed August 12, 1929. Serial No. 385,197.

This invention relates to new and useful improvements in weighing scales.

The objects of the present invention are to provide a weighing scale having a commodity or load platter and a weight platter movable in vertical planes, and a pair of levers of equal ratios and movable in unison, said levers being so interconnected that the parallelism of said platters is maintained at all times without the use of check link mechanism.

Further objects of the invention are to dispense with the check link mechanism and to provide a weighing scale having a commodity platter and a weight plater movable in vertical planes, and a pair of interengaged levers of equal ratios and movable in parallelism, each of said levers supporting each platter so that said platters are supported at a plurality of points and are thus held against tipping or movement out of displacement from vertical plane.

Other objects of the invention are to provide a weighing scale having equal ratio levers operable in parallelism and having a pair of stabilized platters, each of which is supported at spaced points by one end of each lever, whereby each platter is supported by both levers so that a weight can be shifted in any direction on either one of said platters without tipping the latter or effecting the accuracy of the scale.

Additional objects of the invention are to provide a weighing scale having a pair of equal ratio levers and a pair of plates or platters so mounted on said levers that no check link mechanism is necessary to maintain the platters in parallel vertical planes, thereby dispensing with the use of check link mechanism and eliminating friction and loose connections incidental thereto, and thus increasing the efficiency and accuracy of my improved scale.

With these and other objects in view, my invention consists in certain novel features of construction and arrangement of parts, hereinafter more fully described and claimed, and illustrated in the accompanying drawings, in which—

Figure 1 is a perspective view of my improved even balance scale.

Figure 2 is a top plan view with the casing and platters removed.

Figure 3 is an enlarged vertical cross section through the same.

Figure 4 is a transverse cross section taken on line 4—4 of Figure 3.

Figure 5 is a transverse cross section taken on line 5—5 of Figure 3.

Figure 6 is a detail cross section taken on line 6—6 of Figure 2.

In the construction of weighing scales, such as counter scales, a check link is generally used to hold the platter or platters in vertical planes during the operation, and to prevent tipping thereof, particularly when a weight is placed near the edge of the platter away from the axis or center thereof. In the usual construction, this check link is necessary as each platter is usually supported centrally on one end of the scale beam. This single point support permits the platter to maintain vertical alignment during the operating movement of the beam, the ends of which travel in a vertical arc concentric with the fulcrum of the beam.

In order to preserve this vertical alignment of the platters and to stabilize the latter, under-connections are provided for said platters below said beam, said under-connections including a check link. These connections also prevent tipping of the platter when the load or weight is placed on the platform at a point spaced from the center thereof.

The check link mechanism forms a part of a parallelogram with the beam or lever and it is of utmost importance that this mechanism be most accurately constructed and adjusted to maintain accuracy in weighing when load is not placed in center of platter. From continued usage of the scale the pivots or knife edges become dull or worn, thus destroying the parallel relation of the scale beam and check link mechanism with a resultant inaccuracy in proportion to the dimensional change caused by such wear.

Therefore, it will be readily seen that the provision of a scale, such as an even balance scale, wherein check link mechanism is entirely eliminated, while the platters preserve their parallel relation, is highly advantageous both on account of its accuracy and sensibility. This construction is especially desirable on account of the platters preserving their parallelism and being held against tipping without the use of under-connections or check link mechanism.

Referring by numerals to the accompanying drawings, 10 indicates a base on which is arranged a casing 11 which encloses the scale mechanism 12 and has mounted thereon a tower 14. This tower is provided with a glazed opening 15 in which is located a suitable chart 18 over which operates an indicator 17 actuated by said scale mechanism 12.

A weight platter or load offsetting platform 18 is arranged above one end of casing 11 and a commodity or load platter or plate 19 is arranged above said casing near the other end thereof.

Operatively carrying these platters is the scale mechanism 12 which comprises a pair of levers 20 and 21. These levers are of first order and have equal ratios. They are spaced longitudinally of one another with the inner ends of the levers overlapping so that the forward ends 20$^a$ and 21$^a$ of said levers are disposed below the weight platter 18, and the rear ends 20$^b$ and 21$^b$ of said levers are disposed below the commodity platters 19.

As the platters are of comparatively large areas it is desirable to support each platter at a plurality of spaced points which, in the present instance, are four in number arranged near the corners of each platter. To accommodate this horizontal point support, each lever is formed of rectangular frame whereby each end of the lever provides two transversely spaced points of support for the corresponding platter.

The levers as shown are identical in shape and size and are preferably each formed of a single piece casting comprising suitably spaced side members 22 and united by a forward end 24, a rear end 25, and a series of spaced intermediate transverse members 26.

The side members of each lever are provided at points equidistant from the ends thereof with horizontally disposed downwardly presented knife edge fulcrums 27 which project outwardly and laterally from said side members and are operatively supported in upwardly presented V-shaped grooves formed in blocks 28. The latter are arranged in upstanding lugs 29 and 30 fixed to and projecting upwardly from base 11.

As shown in Figure 3, the lugs 30 supporting lever 21 are higher than lugs 29 supporting lever 20 so that said levers are disposed on different horizontal planes. However, said levers can be arranged so as to occupy positions in the same horizontal plane.

The ends of the side members are provided with laterally projecting upwardly presented knife edge fulcrum members 31 which are engaged by the downwardly presented V-shaped grooves formed in the ends of bearing blocks 32. These blocks are carried in bifurcated ends 34 of legs 35 and said legs are formed integral with and depend from spiders 36.

There are two spiders provided, one for each platter, and each spider is formed in its corner with an upwardly presented bore 37 in which is disposed the lower end of a pin rod 38 which latter projects upwardly from said spider.

Each platter is formed on its underside near its corner with an integral depending boss 39 in which is formed a downwardly opening bore 40 for receiving the upper end of the respective rod 38. These bosses 39 are spaced so as to bring the bores 40 in vertical planes with the respective fulcrums and rods 38.

The upper wall 11$^a$ of casing 11 is provided with a plurality of apertures 41 through which the bosses 39 extend into the casing.

Since levers 20 and 21 in the instant case are disposed on different horizontal planes and the spiders 36 are arranged on the same horizontal plane with each other, the forward legs 35$^a$ of said spiders, that is, the legs which are supported by levers 20, are considerably longer than the legs 35$^b$ which engage lever 21. Each spider 36 is integrally formed therewith near its outer end with an opening box member 44 which is adapted to receive shot used in balancing the scale mechanism.

The casing wall 11$^a$ is provided immediately above said box member with an opening 45 through which access can be had thereto without removing the casing. A plate 46 normally closes each opening 45. Each lug 29 and 30 has secured to its upper end an angle-shaped piece 47 which encloses and protects the fulcrums of the respective levers.

Lever 20 carries a pair of spaced laterally disposed pins 48 which extend outwardly from casing 11 through slots formed in the side wall thereof. A horizontal bar 49 is secured to the projecting ends of said pins and slidably mounted on said bar is a counterpoise 50 for tare or fractional indication. A similar bar 51 is carried by lever 21 by means of pins 52. The upper edge of this bar is notched for receiving a counterpoise 53.

One end of each lever 20 and 21 is provided with a longitudinal projection 54, the extent of movement of which is defined by the spaced annular portions or shoulders 55 of member 56. The latter is adjustably seated in a boss 57 extending upwardly from base 10. By means of this arrangement the oscillations of the levers are limited by the adjustment of members 56 and any violent or excessive movement of said levers is thus eliminated.

As shown, the indicator 17 is mounted on lever 20, the axis of the indicator being in vertical plane with the fulcrum of the lever. Thus when said lever occupies balanced position, indicator 17 occupies neutral or zero position and the operative movement of the lever is properly indicated by said indicator. Since the chart 16 is located a substantial distance above lever 20, the indicator is of sufficient length to provide the necessary magnification.

The ratios of the levers are equal and as the two levers are of the same size, it follows that the extent and direction of travel of the corresponding ends of the levers is the same, so that the platter pivotally supported at spaced longitudinal points by said corresponding ends retains its horizontal position at all times, and the two platters are movable in vertical planes and in opposite directions. The two levers are spaced longitudinally with the inner ends overlapping each other and with the corresponding fulcrums spaced longitudinally of each other.

Each platter is supported at a plurality of points spaced longitudinally, and preferably also spaced transversely and located near the edges. This arrangement increases the stability of the platter and prevents tipping thereof so that the placing of the commodity or weight close to the edge of the platter does not affect the weighing accuracy of the scale and does not cause tipping of the platform or binding of the knife edge fulcrums supporting said platter. As the corresponding ends of the levers support the same platter, both levers are operated in unison by the pressure or weight applied to the platter and said levers preserve their parallelism at all times. Furthermore, this arrangement whereby one platter is pivotally supported at spaced points by a plurality of equal ratio levers operating in unison permits the stabilizing of the platters without the use of under-connections such as check link mechanism.

While the beams or levers as shown are identical in size and shape and supported on different planes, it is understood that equal ratio levers of different size and shape may be used in the same scale and that both levers can be supported on the same plane.

The indicating means can be arranged so as to obtain indicating movement from any other movable part of the scale mechanism, or more than one indicating movable element can be provided if so desired.

The novel construction of my improved weighing scale enables me to use knife edge bearings in all pivotal connections, thereby reducing friction to minimum. At the same time the platters are stabilized by the use of a plurality of supports so that no check link under-connections are required.

The use of two tare or weight beams (49 and 51) on either side (or both sides) of the scale is a distinct advantage as it provides a greater flexibility and increases the range of usefulness of the scale.

While the preferred embodiment of my invention is herein shown and described, it will be understood that various changes in the construction and arrangement of parts of my improved scale, may be resorted to without departing from the spirit of my invention.

I claim:

1. A weighing scale comprising a base, two equal ratio levers of the first order fulcrumed on said base and operable in parallelism, a commodity platter supported at spaced points by one end of each lever, a weight platter supported at spaced points by the other end of each lever, a stationary chart, and an indicator fixed to and extending from one of said levers adjacent to the fulcrum thereof and cooperating with said chart.

2. A weighing scale comprising a pair of levers of equal ratio and spaced longitudinally of each other, a pair of platters, each of which is pivotally supported at spaced points by one end of each lever, whereby said platters are stabilized and maintained in parallel planes by said levers, and an indicator fixed to one of said levers for indicating the balanced and unbalanced relation of said platters.

3. A weighing scale comprising a base, a pair of levers of first order having equal ratios and fulcrumed on said base in spaced longitudinal relation, a pair of platters each of which is pivotally supported at longitudinally spaced points by one end of each lever, whereby said platters are stabilized and maintained in parallel vertical planes by said levers, a stationary chart, and an indicator carried by one of said levers and cooperating with said chart for indicating the weighing conditions of said scale.

4. A weighing scale comprising in combination a base, a pair of levers of first order having equal ratios fulcrumed on said base in longitudinally spaced relation, a spider pivotally supported at spaced points on the forward ends of said levers, another spider pivotally supported at spaced points upon the rear ends of said levers whereby said spiders are movable in parallelism with each other in opposite directions, a platter carried by each spider, and weight indicating means carried by one of said levers.

5. A weighing scale comprising in combination a pair of levers of first order having equal ratios and fulcrumed at longitudinally spaced points on said base, a spider arranged above and pivotally mounted on the corresponding ends of said levers whereby each spider is supported at a plurality of spaced points by the spaced corresponding ends of said levers, a casing arranged on said base for enclosing said levers and said spiders, said casing being provided with a plurality of apertures, upward extensions secured in said spiders and extending outwardly through said apertures, and a pair of platters each of which is carried by the extensions of one of said spiders whereby said platters are maintained in horizontal planes and are movable in vertical planes.

6. A weighing scale comprising in combination a pair of levers of first order, having equal ratios and fulcrumed at longitudinally spaced points on said base, a spider arranged above and pivotally mounted on the corresponding ends of said levers whereby each spider is supported at a plurality of spaced points by the spaced corresponding ends of said levers, a casing arranged on said base for enclosing said levers and said spiders, said casing being provided with a plurality of apertures, upward extensions secured in said spiders and extending outwardly through said apertures, a pair of platters each of which is carried by the extensions of one of said spiders whereby said platters are maintained in horizontal planes and are movable in vertical planes, a tower fixed to said casing and provided with an opening, a chart fixed in said tower and visible through said opening, and an indicator fixed to one of said levers and cooperating with said chart.

7. A weighing scale comprising in combination a base, a pair of equal ratio levers of first order fulcrumed on said base in longitudinally spaced relation, a weight platter pivotally mounted at longitudinally spaced points on the forward ends of said levers, a commodity platter pivotally mounted at longitudinally spaced points on the other ends of said levers, whereby said platters are pivotally supported at a plurality of points by said levers and are operable thereby in opposite directions and in parallelism with each other, and an indicator carried by one of said levers to indicate the balanced positions of said scale.

8. In a weighing scale, a lever mechanism comprising two equal ratio levers, a weighing platter supported by one end of each lever, a load offsetting platter supported by the opposite ends of each lever, both platters having a plurality of supports and operating in opposed parallel unison, and weight indicating means including a pointer fixed to and extending radially from one of said levers.

9. In a weighing scale, a lever mechanism comprising two equal ratio levers, a weighing platter supported by one end of each lever, a load offsetting platter supported by the opposite ends of each lever, both platters having a plurality of supports and operating in opposed parallel unison, and a weight indicator mounted on one of said levers for indicating the weighing condition of the scale.

10. In a weighing scale, the combination of two equal ratio levers having fulcrums spaced longitudinally of each other, a load receiving means, knife edge bearings pivotally supporting the latter at a plurality of points on the forward ends of said levers, a load offsetting means, knife edge bearings pivotally supporting said load offsetting means at a plurality of spaced points on the rear ends of said levers, whereby both of said means are movable at all times in parallelism, the fulcrum of each lever being disposed intermediate the knife edge supports of the respective means, and indicating means operable in correlation with one of said levers for indicating the weighing condition of the scale.

11. A weighing scale mechanism comprising in combination a pair of equal ratio levers having fulcrums spaced longitudinally of each other, whereby the respective ends of said levers are spaced longitudinally, a load platter, knife edge bearings for pivotally supporting said load platter by the forward ends of said levers at a plurality of spaced points, a load offsetting means, and knife edge bearings for pivotally supporting said load offsetting means by the rear ends of said levers at a plurality of spaced points, the fulcrum of each lever being arranged intermediate the corresponding ends of said levers.

12. A weighing scale mechanism comprising in combination a pair of equal ratio levers having fulcrums spaced longitudinally of each other, whereby the respective ends of said levers are spaced longitudinally, a load platter, knife edge bearings for pivotally supporting said load platter by the forward ends of said levers at a plurality of spaced points, a load offsetting means, knife edge bearings for pivotally supporting said load offsetting means by the rear ends of said levers at a plurality of spaced points, and weight indicating means including a stationary chart and a pointer fixed to one of said levers and extending radially therefrom.

13. A weighing scale mechanism comprising in combination a pair of equal ratio levers having fulcrums spaced longitudinally of each other, whereby the respective ends of said levers are spaced longitudinally, a load platter, knife edge bearings for pivotally supporting said load platter by the forward ends of said levers at a plurality of spaced points, a load offsetting means, knife edge bearings for pivotally supporting said load offsetting means by the rear ends of said levers at a plurality of spaced points, and an indicator fixed to one of said levers in vertical plane with the fulcrum thereof, and extending therefrom for a suitable distance.

14. A weighing scale comprising a base, two equal ratio levers of first order fulcrumed on said base and operable in parallelism, a weighing beam carried by each lever, a commodity platter supported at a plurality of spaced points by one end of each lever, a weight platter supported at a plurality of spaced points by the other end of each lever, and indicating means cooperating with one of said levers.

15. A weighing scale comprising a pair of equal ratio levers of first order having fulcrums spaced longitudinally of each other, a tare beam carried by each lever, and a pair of platters each of which is pivotally supported at spaced points by one end of each lever, whereby said platters are stabilized and maintained in parallel planes at all times.

16. In a weighing scale, the combination of a pair of equal ratio levers of first order spaced longitudinally of each other, a tare beam carried by each lever, a pair of platters, and knife edge bearings pivotally supporting each platter on one end of each lever at a plurality of spaced points.

17. In a weighing scale, the combination of a pair of equal ratio levers of first order, having longitudinally spaced fulcrums, a tare beam carried by each lever, a load receiving member having spaced pivotal supports on one end of each lever, and a load offsetting member in pivotal engagement at spaced points with the other end of each lever, whereby said members are stabilized and operate in parallel planes.

In testimony whereof I hereunto affix my signature this 22nd day of July, 1929.

HARRY C. SCHAPER.